US008638923B1

(12) United States Patent
Zhang et al.

(10) Patent No.: US 8,638,923 B1
(45) Date of Patent: Jan. 28, 2014

(54) DYNAMIC REGISTRATION FOR CALL-PICKUP GROUP MEMBERSHIP, AND SELECTIVE REROUTING OF CALLS

(75) Inventors: Baoquan Zhang, Overland Park, KS (US); Farni B. Weaver, Spring Hill, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1823 days.

(21) Appl. No.: 11/675,921

(22) Filed: Feb. 16, 2007

(51) Int. Cl.
*H04M 3/42* (2006.01)

(52) U.S. Cl.
USPC ............. 379/211.02; 379/212.01; 379/220.01

(58) Field of Classification Search
USPC ............................ 379/211.02, 212.01, 220.01
See application file for complete search history.

(56) References Cited

U.S. PATENT DOCUMENTS

| 6,292,672 | B1 | 9/2001 | Chavez, Jr. | |
|---|---|---|---|---|
| 6,363,142 | B1 | 3/2002 | Stumer | |
| 6,718,178 | B1 | 4/2004 | Sladek et al. | |
| 7,136,475 | B1* | 11/2006 | Rogers et al. | 379/213.01 |
| 7,865,602 | B2* | 1/2011 | Garcia-Martin | 709/227 |
| 2002/0086666 | A1 | 7/2002 | Chen | |
| 2003/0027565 | A1* | 2/2003 | Bossemeyer et al. | 455/422 |
| 2004/0147258 | A1 | 7/2004 | Dokko | |
| 2005/0033799 | A1* | 2/2005 | Shin et al. | 709/200 |
| 2005/0238157 | A1 | 10/2005 | Shaffer et al. | |
| 2005/0238517 | A1 | 10/2005 | Gray, Jr. | |
| 2006/0293033 | A1* | 12/2006 | Ma et al. | 455/414.1 |
| 2008/0043969 | A1* | 2/2008 | Shi | 379/211.02 |

FOREIGN PATENT DOCUMENTS

JP   2005244415   8/2005

OTHER PUBLICATIONS

Cisco MGX 8260 Installation, Configuration, and WebViewer Guide, Chapter 8—Call Control, Release 1.1, Part No. 78-10633-01, Mar. 2000.
Cisco CallManager System Guide, Chapter 28—Call Pickup and Group Call Pickup, 78-15310-01, Jun. 3, 2003.
Ericsson, IMS—IP Multimedia Subsystem, The value of using the IMS architecture, Oct. 2004.
Cory Andrews, Switchvox Launches PBX Solution for the SMB Budget at Spring VON 2006, Voipsupply.com Blog, downloaded from the world wide web at http://blog.voipsupply.com/ip_pbx_solutions/, Mar. 23, 2006.
Chen, Rebecca LJ et al., Introduction to IP Multimedia Subsystem (IMS), Part 1: SOA Parlay X Web services, downloaded from world wide web at http:///www-128.ibm.com/developerworks/webservices/library/ws-soa-ipmultisub1/index.html, Sep. 12, 2006.
Waclawsky, John G, IMS 101: What you need to know now, Business Communications Review, Jun. 2005, pp. 18-23.

(Continued)

*Primary Examiner* — Quynh Nguyen (57) ABSTRACT

A method and system for registering a client for a call-pickup service and for executing the call-pickup service for a new call placed to a given communication device. The call-pickup service may carried out, in part, by providing the client with notification of when the new call is placed to the given communication device, the client requesting that the new call be re-routed to a location other than the given communication device, and a server re-routing the new call to the location other than the given communication device. The location other than the given communication device may be the client that registers for the call-pickup service or another location.

27 Claims, 5 Drawing Sheets

(56) References Cited

OTHER PUBLICATIONS

Binary Runtime Environment for Wireless, downloaded from the world wide web at http://en.wikipedia.org/wiki/BREW on Sep. 22, 2006.

UTStarcom, The Cutting Edge is the UTStarcom MovingMedia® 2000 All-IP Solution—Enabling IP-Based CDMA Voice and Data Services, Mar. 3, 2006.

IP Multimedia Subsystem, downloaded from the world wide web at http://web.archive.org/web/20060515181405/http://en.wikipedia.org/wiki/IP_Multimedia_Subsystem, as archived on May 15, 2006.

The VoIP Insiders, VoIP News, VoIP Reviews, and VoIP Information Powered by VoIP Suppy, archived Feb. 4, 2007 at http://web.archive.org/web/20070204072844/http://blog.voipsupply.com/ip_pbx_solutions/ pp. 1-11.

\* cited by examiner

DYNAMIC REGISTRATION FOR CALL-PICKUP GROUP MEMBERSHIP, AND SELECTIVE REROUTING OF CALLS

FIELD OF INVENTION

The present invention relates to communication devices, and more particularly to using a remote communication device to answer a call placed to a called communication device.

DESCRIPTION OF RELATED ART

Telephone systems allow a caller to call a called party's telephone and to carry out a communication with the called party. When the called party is not present at the called party's telephone, a call placed to the called party may go unanswered, may be answered by an answering machine, or may be routed to a voice mail system. In some telephone systems however, such as a private branch exchange (PBX) telephone system, two or more telephones may be associated as a call pickup group. In this way, when a user of a given telephone of the call pickup group hears another telephone of the call pickup group ringing, that user may use the given telephone to answer the call placed to the other telephone.

SUMMARY

The present invention provides a method and system for registering a client as a call-pickup group member and for performing a call-pickup service to selectively reroute a call placed to a given communication device to a location other than the given communication device.

In one respect, in a system comprising a server and a client, an exemplary embodiment of the present invention may take the form of a method carried out by the server. The method may include: (i) registering the client to receive notification of when a call has been placed to a given communication device, (ii) detecting placement of a new call to the given communication device, and responsively notifying the client of the new call placement, and (iii) receiving from the client a request for the server to route the new call to a location other than the given communication device, and responsively routing the new call to the location other than the given communication device.

In another respect, in a system comprising a server and a client, an exemplary embodiment of the present invention may take the form of a method carried out by the client. The method may include: (i) sending to the server a request for the server to register the client to receive notification of when a call has been placed to a given communication device, (ii) receiving from the server a notification of when a new call has been placed to the given communication device, and (iii) thereafter, sending to the server a request to route the new call to a location other than the given communication device.

In yet another respect, an exemplary embodiment of the present invention may take the form of a system comprising: (i) a user interface, (ii) a processor, (iii) a network communications section for communicating with a server via a network, and (iv) data storage. The data storage may contain program logic executable by the processor to cause the network communications section to provide to the network for transmission, in turn, to the server a first request and a second request. The first request may comprise a request for the server to register the system to receive notification of when a call has been placed to a given communication device. After the network communications section provides the first request to the network, the network communications section may receive via the network a notification of when a new call has been placed to the given communication device. The second request may comprise a request to re-route the new call.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

Reference numerals are shown in the drawings to identify various elements of the drawings. Drawing elements having identical reference numerals are substantially identical or identical elements.

DETAILED DESCRIPTION

1. Overview

The present invention is directed to a method and system for registering a client for a call-pickup service and for selective re-routing of calls. The call-pickup service may be carried out, in part, by a server that registers the client for the call-pickup service. The call-pickup service may allow the client to (i) receive notification of when a new call is placed to a given communication device, (ii) request that the call be re-routed to a location other than the given communication device, and (iii) receive the re-routed call.

2. Exemplary Architecture

Figure 1:
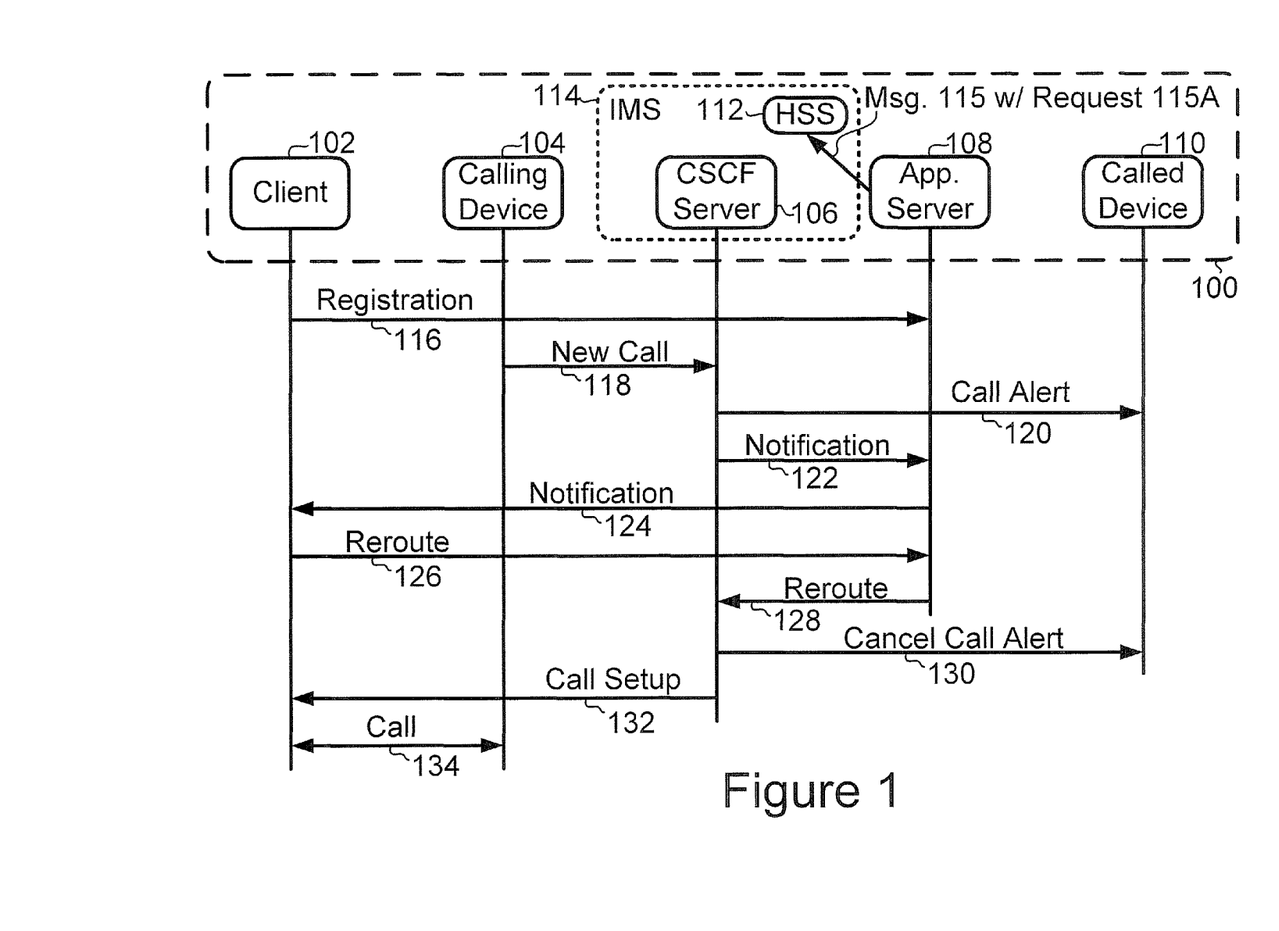
FIG. 1 is a block diagram of an exemplary communication system and a flow diagram depicting communications that may be carried out by various elements of the communication system.

FIG. 1 is a block diagram of an exemplary communications system 100 and a flow diagram depicting exemplary communications that may be carried out between various elements of communications system 100. As shown in FIG. 1, system 100 may include a client 102, a calling device 104, a call session call function (CSCF) server 106, an application server 108, a called device 110, and a Home Subscriber System (HSS) server 112. System 100 may include one or more additional elements, such as one or more clients, calling devices, CSCF servers, application servers, and/or called devices, but these one or more additional elements are not shown for clarity of FIG. 1.

Client 102 may comprise any of a variety of devices that communicate directly or indirectly with at least one server that performs a service for client 102. In one respect, client 102 may comprise a wireless communication device, such as a cellular telephone, a satellite telephone, a personal digital assistant (PDA), or a laptop computer having a wireless network interface. In another respect, client 102 may comprise a wireline communication device such as (i) a plain old telephone system (POTS) telephone that connects to a public switched telephone network (PSTN), (ii) a private branch exchange (PBX) telephone that connects to a PBX network, or (iii) a laptop computer having a wireline network interface. In yet another respect, client 102 may comprise program logic for which at least one server performs a service. This program logic may be contained within data storage accessible by and/or within one of the exemplary wireline or wireless communication devices listed above. Other examples of client 102 are also possible.

Calling device 104 may comprise any of a variety of devices that place a call to a called device (e.g., called device 110). Calling device 104 may comprise a wireless communication device, such as a cellular telephone, a satellite telephone, PDA, or a laptop computer having a wireless network interface. Alternatively, calling device 104 may comprise a wireline communication device such as a POTS telephone, a PBX telephone, or a laptop computer having a wireline network interface. Other examples of calling device 104 are also possible.

Calling device 104 may place any of a variety of calls. For example, calling device 104 may place a voice call, a video call, or a data call such as a facsimile call. Further, calling device 104 may receive a call such as a voice, video or data call placed from another calling device. Other examples of a call placed by or received by calling device 104 are also possible.

Called device 110 may comprise any of a variety of devices to which a calling device places a call. Called device 110 may comprise a wireless communication device, such as a cellular telephone, a satellite telephone, PDA, or a laptop computer having a wireless network interface. Alternatively, called device 110 may comprise a wireline communication device such as a POTS telephone, a PBX telephone, or a laptop computer having a wireline network interface. Other examples of called device 110 are also possible.

Calling device 104 and called device 110 may each function as a client for which a server performs one or more services. Further, one or more of the servers described herein may function as a client for which another server performs one or more services.

CSCF server 106 may comprise one or more servers that are part of an IP Multimedia Subsystem (IMS) 114. IMS 114 may comprise a sub-system using SIP messaging to carry out IP based telephony and multimedia services. IMS 114 may be defined by a standards group such as the $3^{rd}$ Generation Partnership Project (3GPP), the $3^{rd}$ Generation Partnership Project 2 (3GGP2), or another standards group. CSCF server 106 may perform a variety of services, such as processing SIP messages for clients and servers communicating via IMS 114.

Application server 108 may perform one or more services for one or more clients such as client 102, calling device 104, and/or called device 110. Application server 108 may comprise computer-readable program logic executable by a processor so as to perform the one or more services. Application server 108 may comprise the processor that executes the computer-readable program logic. IMS 114 may include application server 108.

HSS server 112 may access and/or comprise data storage containing data for clients and/or servers communicating via IMS 114. As an example, the data storage may contain data identifying a client (e.g. client 102 or called device 110). The data identifying a client may include a telephone number associated with the client, one or more SIP uniform resource indicators (URIs) associated with the client, and an electronic serial number (ESN) (e.g., an International Mobile Subscriber Identity (IMSI)) unique to the client. As another example, the data storage may contain registration data that identifies how a new call placed to called device 110 should be processed (e.g., routed) and whether to provide notification to client 102 when the new call is placed. CSCF server 106 and/or application server 108 may query the data storage of HSS server 112 so as to access data contained within the data storage. Table 1 herein shows an example of data that may be contained within the data storage.

The flow diagram of FIG. 1 depicts exemplary communications 116, 118, 120, 122, 124, 126, 128, 130, 132, and 134 that may be carried out in accordance with the present invention. Two or more of the exemplary communications 116, 118, 120, 122, 124, 126, 128, 130, 132, and 134 may be carried out at substantially the same time, and/or one or more of the exemplary communications 116, 118, 120, 122, 124, 126, 128, 130, 132, and 134 may be omitted.

As shown in the flow diagram of FIG. 1, client 102 may send to application server 108 a registration request 116. Registration request 116 may trigger a registration process that causes client 102 to become registered to receive notification of when a call has been placed to called device 110. As an example, registration request 116 may comprise one or more SIP messages, such as a SIP SUBSCRIBE message.

Registration request 116 may comprise a variety of data. For example, registration request 116 may include data identifying client 102, such as a telephone number or IP address associated with client 102, and data identifying called device 110, such as a telephone number or IP address associated with called device 110. As another example, registration request 116 may include data such as a password for authenticating client 102 and for determining that client 102 has permission to register to receive notification of when a call has been placed to called device 110.

In response to receiving registration request 116, application server 108 may cause some or all of the data received in registration request 116 to be stored in data storage accessible by application server 108 or another server. Subsequently, this stored data may be accessed by application server 108 or another server to respond to queries regarding how a new call placed to called device 110 should be processed.

Alternatively, in response to receiving registration request 116, application server 108 may send to HSS 112 a message 115 comprising: (i) some or all of the data received in registration request 116, and (ii) a request 115A to register client 102 to receive notification of when a call has been placed to called device 110. In response to receiving request 115A, HSS 112 may store the data received via message 115. Subsequently, HSS 112 may use this stored data to respond to queries from CSCF server 106 and/or application server 108 regarding how a new call placed to called device 110 should be processed.

Next, calling device 104 may send to CSCF server 106 a new call request 118 to request establishment of a call between calling device 104 and called device 110. As an example, new call request 118 may comprise a SIP message such as a SIP INVITE message that includes data identifying calling device 104 and data identifying called device 110.

CSCF server 106 may perform any of a variety of functions after receiving new call request 118. For example, CSCF server 106 may query HSS 112 to determine how new call request 118 should be processed. In response to this query, HSS 112 may send to CSCF server 106 a request for CSCF server 106 to send a call alert to called device 110 and/or a request for CSCF server to send a notification to application server 108. Other examples of functions performed by CSCF server 106 after receiving new call request 118 are also possible.

Next, CSCF server 106 may send to called device 110 the call alert 120. As an example, call alert 120 may comprise a SIP INVITE message that indicates calling device 104 has placed a new call to called device 110. After receiving call alert 120, called device 110 may play out a ringtone to alert a user that the new call has been placed to called device 110. As another example, call alert 120 may comprise a SIP NOTIFY message that indicates a new call has been placed to called device 110 and/or that the new call is being rerouted to client 102. After receiving the SIP NOTIFY message, called device 110 may display a message that indicates the new call was placed to called device 110 and/or that the new call was routed to client 102. Other examples of call alert 120 are also possible.

Next, CSCF server 106 may send to application server 108 a notification 122 that indicates a new call has been placed to called device 110. CSCF server 106 may send notification 122 in response to receiving new call request 118 and/or in response to receiving from HSS 112 a request to send a notification to application server 108. As an example, notification 122 may comprise a SIP NOTIFY message. Notification 122 may indicate that a new call has been placed to called device 110, the new call has been placed by calling device 104, and/or that a notification should be sent to client 102. Other examples of notification 122 are also possible.

Next, application server 108 may send to client 102 a notification 124. Application server 108 may send notification 124 in response to receiving notification 122 or in response to receiving a request that a notification should be sent to client 102. Notification 124 may indicate a new call has been placed to called device 110. Notification 124 may comprise data identifying calling device 104, such as a telephone number or IP address associated with calling device 104, and data identifying a caller associated with calling device 104 (i.e., caller ID data). As an example, notification 124 may comprise a SIP NOTIFY message. Other examples of notification 124 are also possible.

In response to receiving notification 124, client 102 may play out a ringtone and/or display a message so as to alert a user that a new call placed to another device (e.g., called device 110) is available for re-routing to a location other than called device 110. This ringtone may be the same as a ringtone played out by client 102 when a new call is placed directly to client 102. Alternatively, this ringtone may differ from a ringtone played out by client 102 when a new call is placed directly to client 102. In this way, a user may distinguish whether the alert is being played out for a call that may be rerouted to client 102 or for a call placed directly to client 102.

Next, client 102 may send to application server 108 a reroute request 126. Reroute request 126 may be sent in response to client 102 receiving notification 124. Alternatively, reroute request 126 may be sent in response to client 102 receiving (at a user interface of client 102) a user input to request that the new call be rerouted. As an example, reroute request 126 may comprise one or more SIP messages including a SIP NOTIFY message or a SIP INFO message. Other examples of reroute request 126 are also possible.

Next, application server 108 may send to CSCF 106 a reroute request 128. Reroute request 128 may be sent in response to application server 108 receiving reroute request 126. Reroute request 128 may comprise one or more SIP messages including a SIP NOTIFY message, or a SIP INFO message. Other examples of reroute request 128 are also possible.

Next, CSCF server 106 may send to called device 110 a cancel call alert 130. CSCF server 106 may send cancel call alert 130 in response to receiving reroute request 128. As an example, cancel call alert 130 may comprise one or more SIP messages such as a SIP CANCEL message and/or a SIP BYE message. After receiving cancel call alert 130, called device 110 may stop playing out a ringtone that began playing in response to called device 110 receiving call alert 120.

Next, CSCF server 106 may send to client 102 a call setup request 132. CSCF server 106 may send call setup request 132 in response to receiving reroute request 128. As an example, call setup request 132 may comprise a SIP INVITE message for inviting client 102 to participate in a call with calling device 104. After receiving call setup request 132, client 102 may send any of a variety of messages to CSCF server 106 such as a SIP RINGING message and/or a SIP OK message so as to acknowledge that client 102 accepts the call placed by calling device 104.

Next, client 102 and calling device 104 establish call 134. Call 134 may be any of a variety of calls such as a voice call, video call, or a data call. During call 134, client 102 and calling device 104 may send communications to each other. Such communications may be carried out using any of a variety of communication protocols such as the Real-time Transport Protocol (RTP) or the RTP/audio video profile (RTP/AVP) protocol. Other examples of the communication protocols for carrying out communications for call 134 are also possible.

Figure 2:
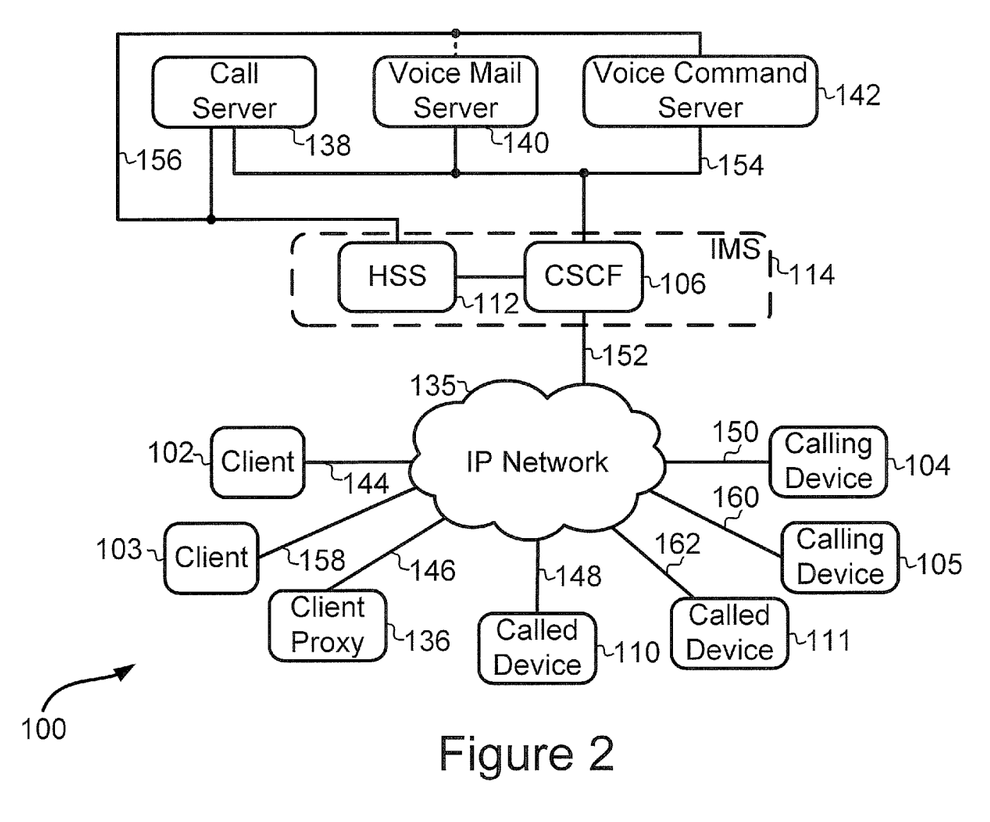
FIG. 2 is a block diagram depicting additional details of the exemplary communication system shown in FIG. 1.

Next, FIG. 2 is a block diagram depicting additional details of communications system 100. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, or as any suitable combination of hardware, firmware, and/or software.

As shown in FIG. 2, communications system 100 may include an IP network 135, a client proxy 136, a call server 138, a voice mail server 140, a voice command server 142, and communication paths 144, 146, 148, 150, 152, 154, 156, 158, 160, and 162. Communications system 100 may also include a client 103, a calling device 105 and a called device 111. Calling device 105 may place a call to called device 110, called device 111, and/or one or more other devices.

IP network 135 may comprise a network for carrying out communications according to the Internet Protocol (IP). IP network 135 may comprise a physical layer (i.e., layer one of the OSI model of computer networking) including any of a variety of wireline and/or wireless communication paths. A wireline communication path may comprise any of a variety of conductors or combination of conductors. As an example, the conductors may comprise coaxial cable, fiber optic cable, category 5 cable, a twisted pair of copper wire, or another type of conductor. A wireless communication path comprises an air interface that carries communications according to an air interface protocol. IP network 135 may include one or more of communication paths 144, 146, 148, 150, 152, 154, 156, 158, 160, and 162, and/or portions of one or more of communication paths 144, 146, 148, 150, 152, 154, 156, 158, 160, and 162.

Client proxy 136 may be any of a variety of devices that performs a function typically performed or performable by client 102. For example, client proxy 136 may send registration request 116 to application server 108 so as to initiate registration of client 102 to receive notification of when a new call is placed to called device 110. In this way, client 102 does not have to send registration request 116. Client proxy 136 may comprise a laptop computer including Microsoft Windows® XP software and a user interface (e.g., a keyboard) for entering instructions that cause client proxy 136 to send registration request 116.

Call server 138 may perform any of a variety of services pertaining to calls for client 102 and/or one or more other clients. Application server 108 (shown in FIG. 1) may be arranged as call server 138 such that call server 138 performs the functions of receiving registration request 116 from client 102, receiving notification 122 from CSCF server 106, sending notification 124 to client 102, receiving reroute request 126 from client 102, and/or sending reroute request 128 to CSCF server 106.

Voice mail server 140 may perform any of a variety of voice-mail services for client 102 and/or one or more other clients. For example, reroute request 126 may request application server 108 to reroute the new call to voice mail server 140, and reroute request 128 may request CSCF server 106 to reroute the new call to voice mail sever 140. CSCF server 106 may then send a call setup request to voice mail server 140, and voice mail server 140 may responsively set up the new call with calling device 104. After setting up the call, voice mail server 140 may receive a voice message from calling device 104 and store the received voice message for client 102. After ending the call, voice mail server 140 may (i) notify client 102 that the voice message has been stored, (ii) establish a communication session with client 102, and (iii) during the communication session, receive from client 102 a request for the voice message and responsively provide the stored voice message to client 102.

The communication session established between voice mail server 140 and client 102 may comprise a telephone call, a Point-to-Point Protocol (PPP) such as a session in accordance with IETF RFC 2516—A method for transmitting PPP over Ethernet (PPPoE), or another type of session.

A user of client 102 may request that the new call be rerouted to voice mail server 140 so that voice mail server 140 can answer the new call instead of another voice mail server that provides voice mail services to called device 110. Other examples of why a user of client 102 may request that the new call be rerouted to voice mail server 140 are also possible.

Voice command server 142 may perform any of a variety of services pertaining to spoken voice commands. Voice command server 142 may perform the services for client 102 and/or one or more other clients. Client 102 may detect a spoken voice command, create a message (e.g., reroute request 126) comprising data representing the spoken voice command, and then send the message to voice command server 142. For example, client 102 may detect a voice command "Pickup" that is spoken after client 102 receives notification 124. Client 102 may then create a message comprising data representing the voice command "Pickup," and then send the message to voice command server 142.

After receiving the message including data representing a spoken voice command, voice command server 142 may query HSS server 112 so as to determine how to respond to the received message and/or how to process the new call placed to called device 110. For example, voice command server 142 may determine that a spoken voice command of "Pickup" indicates that a new call placed to called device 110 should be rerouted to a location other than called device 110. In particular, voice command server 142 may determine that the new call should be routed to client 102 or to voice mail server 140. Voice command server may then notify another server (e.g., CSCF server 106 or application server 108) that the new call should be routed to a location other than called device 110. Other examples of spoken voice commands are also possible.

For purposes of this description, (i) client 102 is associated with a telephone number of 555-102-0102 and a URI of client_102@xyz.com, (ii) client 103 is associated with a telephone number of 555-103-0103 and a URI of client_103@xyz.com, (iii) calling device 104 is associated with a telephone number of 555-104-0104 and a URI of device_104@xyz.com, (iv) calling device 105 is associated with a telephone number of 555-105-0105 and a URI of device_105@xyz.com, (v) CSCF server 106 is associated with a URI of CSCF_106@xyz.com, (vi) application server 108 is associated with a URI of spplication_server@xyz.com, (vii) called device 110 is associated with a telephone number of 555-110-0110 and a URI of device_110@xyz.com (viii) called device 111 is associated with a telephone number of 555-111-0111 and a URI of device_111@xyz.com, (ix) client proxy 136 is associated with a URI of client_proxy@xyz.com, and (x) voice mail server 140 is associated with an IP address (according to IPv4) of 191.256.555.140. A person having ordinary skill in the art will realize however that each of these devices or servers may be associated with identifying data other than or in addition to a telephone number, an IP address, and/or a URI.

As indicated above, HSS 112 may comprise and/or access data storage for clients and/or servers communicating via IMS 114. Table 1 lists example data that may be contained in data storage for HSS 112.

TABLE 1

Data contained in Data Storage

| Registering Device and Password (PW) | Calling Device | New Call Original Destination | Register to be Notified |
|---|---|---|---|
| Client 102 or Client Proxy 136/PW1 | Any | 555-110-0110 device_110 @xyz.com | 555-102-0102 client_102 @xyz.com |
| Client 103/PW2 | 555-104-0104 device_104 @xyz.com | 555-111-0111 device_111 @xyz.com | 555-102-0103 client_103 @xyz.com |
| Client 103/PW2 | 555-105-0105 device_105 @xyz.com | 555-111-0111 device_111 @xyz.com | 191.256.555.140 (VM Server 140) |

As shown in Table 1, client 102 or client proxy 136 may register client 102 to be notified when any calling device places a new call to called device 110. Client 102 or client proxy 136 may be required to enter a password (e.g., PW1) prior to client 102 becoming registered. Further, client 103 may register client 103 to be notified when calling device 104 places a new call to called device 111 and register voice mail server 140 to be notified when calling device 105 places a new call to called device 111. Client 103 may be required to enter a password (e.g., PW2) prior to client 103 or voice mail server 140 becoming registered. A server such as application server 108, HSS 112, or call server 138 may query data storage containing the data shown in Table 1 so as to determine how a new call is to be processed.

Figure 3:
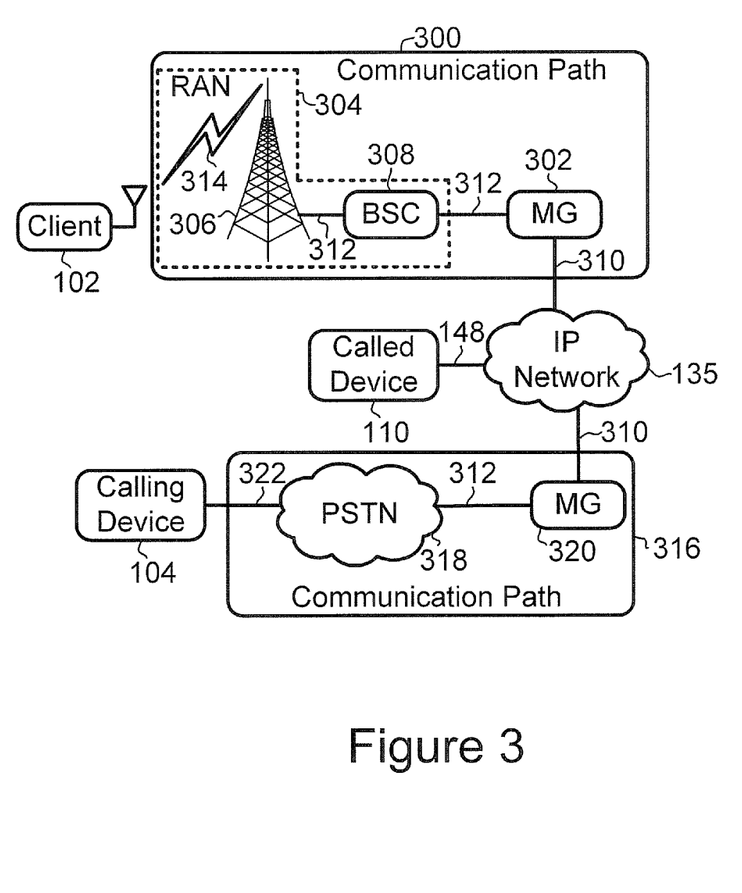
FIG. 3 is a block diagram depicting exemplary communication paths that may be used to carry out communications in the exemplary communication system.

Next, FIG. 3 is a block diagram depicting exemplary communication paths that may be used to carry out communications in accordance with the present invention. As shown in FIG. 3, a communication path 300 provides a path for communications to be carried out between client 102 and IP network 135. In accordance with this exemplary communication path, client 102 may comprise a wireless communication device.

Communication path 300 may include: (i) a media gateway 302, (ii) a radio access network (RAN) 304 including a base transceiver station (BTS) 306 and a base station controller (BSC) 308, and (iii) communication links 310 and 312. Communication path 144, as well as one or more of the other communication paths shown in FIG. 1, may be arranged as communication path 300. Other examples of a communication path for carrying out communications between client 102 and IP network 135 are also possible.

A media gateway (e.g., media gateway 302) may convert communications from one type of network to communications for transmission across another type of network. As an example, media gateway 302 may receive communications (e.g., SS7 signals) from RAN 304 and convert the received communications to communications (e.g., SIP signals) for transmission across IP network 135. As another example, media gateway 302 may receive communications (e.g. SIP signals) from IP network 135 and convert the received communications to communications (e.g., SS7 signals) for transmission across RAN 304. The SS7 signals may be time division multiplexed (TDM) signals. The SIP signals may be carried in IP packets. Other examples of communications a media gateway may convert are also possible.

A media gateway (e.g., media gateway 302) may comprise and/or be controlled by a media gateway controller. Media gateway 302 may connect to IP network 135 via a communication link 310. As an example, communication link 310 may comprise a packet-switched X.25 or frame relay network carrying IP packets having SIP signals as a payload. Media gateway 302 may connect to BSC 308 via a communication link 312. As an example, communication link 312 may comprise a T-1 line, T-3 line, E-1 line, or E-3 line for carrying TDM signals (e.g., SS7 signals). Other examples of communication links 310 and 312 are also possible.

BTS 306 radiates radio frequency (RF) signals 314 away from BTS 306 so as to form a cell or cell sector. Client 102 may be located within the cell or cell sector formed by RF signals 314. Client 102 may receive RF signals 314 and may transmit RF signals receivable at BTS 306. RF signals 314, as well as the RF signals transmitted by client 102, may be arranged according to an air interface protocol, such as a Code Division Multiple Access (CDMA) protocol. Other examples of an air interface protocol are also possible.

BSC 308 may perform a variety of functions. For example, BSC 308 may (i) allocate radio resources to client 102 and to one or more other wireless communication devices, (ii) manage handoff of calls from BTS 306 to another BTS or from another BTS to BTS 306, and (iii) provide BTS 306 with connectivity to media gateway 302. BSC 308 may comprise a packet control function (PCF) for controlling transmission of data packets between BTS 306 and media gateway 302. These data packets may have a destination of client 102 and a payload including voice, data, and/or video communications. BSC 308 may be integrated in whole or in part with BTS 306.

Further, as shown in FIG. 3, a communication path 316 provides a path for communications to be carried out between calling device 104 and IP network 135. Communication path 150 (shown in FIG. 1), as well as one or more of the other communication paths shown in FIG. 1, may be arranged as communication path 316. Other examples of a communication path for carrying out communications between calling device 104 and IP network 135 are also possible.

Communication path 316 may comprise a PSTN 318, a media gateway 320, and communication links 310, 312, and 322. PSTN 318 may comprise a circuit-switched network that connects communication link 312 to communication link 322. PSTN 318 may connect to media gateway 320 via communication link 312.

Communication link 322 may comprise a twisted pair of copper wires. Communication link 322 may be arranged as a local loop telephone line that provides calling device 104 with connectivity to PSTN 318.

Media gateway 320 may receive communications (e.g., SS7 signals, a vertical service code, and/or dual tone multiple frequency (DTMF) signals) from PSTN 318 and convert the received communications to communications (e.g., SIP signals) for transmission across IP network 135. A vertical service code is a telephone number to request performance of a given service, such as "*66" to request automatic callback when a called telephone number becomes idle. As another example, media gateway 320 may receive communications (e.g. SIP signals) from IP network 135 and convert the received communications to communication (e.g., SS7 signals and DTMF signals) for transmission across PSTN 318.

Figure 4:
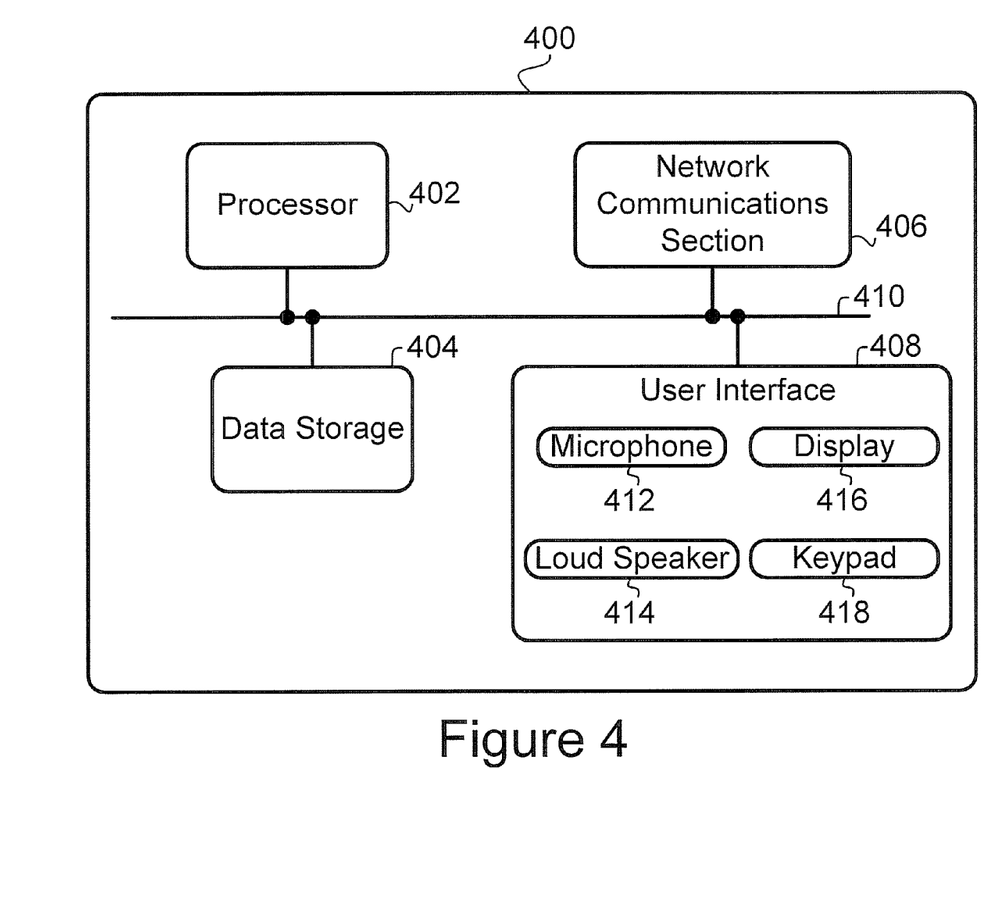
FIG. 4 is a block diagram of an exemplary system for carrying out the present invention.

Next, FIG. 4 is a block diagram of an exemplary system 400 for carrying out the present invention. As shown in FIG. 4, system 400 may include a processor 402, data storage 404, a network communications section 406, and a user interface 408, all linked together via a system bus, network, or other connection mechanism 410.

Client 102 and/or client 103 may be arranged as system 400. In this regard, system 400 may carry out the communications carried out by client 102 as shown in the flow diagram of FIG. 1.

Processor 402 may comprise one or more processors that execute computer-readable program instructions. As an example, the one or more processors may include one or more general purpose processors, such as one or more INTEL microprocessors, and/or one or more special purpose processors, such as one or more digital signal processors.

Data storage 404 comprises a computer readable medium. A computer readable medium may comprise volatile and/or non-volatile storage components, such as optical, magnetic, organic or other memory or disc storage, which can be integrated in whole or in part with a processor, such as processor 402. Alternatively, the entire computer readable medium may be remote from processor 402 and coupled to processor 402 via connection mechanism 410.

Data storage 404 may contain various types of data. For instance, data storage 404 may contain computer-readable program instructions executable by processor 402. As an example, the program instructions executable by processor 402 may cause network communications section 406 to send communications to a network (e.g., IP network 135). In particular, processor 402 may cause network communications section 406 to send to IP network 135 registration request 116 and reroute request 126.

As another example, the program instructions may comprise instructions for detecting receipt of a notification of when a new call has been placed to called device 110 and for detecting receipt of a call setup request (e.g., call setup request 132). In response to detecting the notification, processor 402 may execute the program instructions that cause network communications section 406 to send reroute request 126 to IP network 135. In response to detecting call setup request 132, processor 402 may execute program instructions for setting up call 134.

As yet another example, the program instructions may comprise instructions for performing speech recognition of signals representing spoken commands. The spoken commands may be detected by user interface 406. User interface 406 may convert the spoken command into a signal representing the spoken command and then provide the signal to processor 402. In response to receiving a signal representing a spoken command, processor 402 may execute program instructions to determine which command was spoken and to then cause network communications section 406 to send to IP network 135 a communication (e.g., registration request 116 or reroute request 126) representing the spoken command as determined by processor 402.

For instance, user interface 406 may detect a spoken command "Register" and provide to processor 402 a signal representing the "Register" command. In response to receiving this signal, processor 402 may determine the "Register" command was spoken and then cause network communications section 406 to transmit registration request 116 to network 135. Similarly, user interface 406 may detect a spoken command "Pickup" and provide to processor 402 a signal representing the "Pickup" command. In response to receiving this signal, processor 402 may determine the "Pickup" command was spoken and then cause network communications section 406 to transmit reroute request 126 to network 135. Other examples of spoken commands and program instructions for determining these other commands were spoken are also possible.

Network communications section 406 may interface directly to any of a variety of networks. For example, network communications section 406 may interface directly to RAN 304, IP network 135, PSTN 318, and/or another network. In this regard, network communications section 406 may interface to a network wirelessly (e.g., an air interface of RAN 304) and/or to a network via a wired connection (e.g., a wired local loop of PSTN 318).

Network communications section 406 may be arranged in various configurations to interface directly to a network. For example, network communications section 406 may include a chipset and antenna for performing wireless communication over an air interface of RAN 304. An exemplary chipset that facilitates communication according to the CDMA air interface protocol is the MSM6800 chipset manufactured by Qualcomm Incorporated of San Diego, Calif. Other examples of a chipset for performing wireless communication over an air interface of RAN 304 and other examples of air interface protocols are also possible.

As another example, network communications section 406 may include a network interface card (NIC) including a chipset for performing wireline communications. As an example, a NIC with a chipset for performing wireline communications according to the IEEE 802.3® standard for Carrier Sense Multiple Access with Collision Detection (CSMA/CD) Access Method is the SP2610R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

As yet another example, network communications section 406 may include any electronic circuitry (known to those having ordinary skill in the art) for producing DTMFs signals. In this way, network communications section 406 may send via PSTN 318 DTMF signals representing a vertical service code. Other examples of network communication section 406 are also possible.

User interface 408 may comprise one or more elements that allow a user to interact with system 400. In one respect, a user may interact with system 400 by providing data to system 400. User interface 408 may include a microphone 412 such that a user may interact with system 400 by providing audible data (e.g., spoken voice commands) to microphone 412. Microphone 412 may comprise and/or be connected to electronic circuitry that connects to processor 402.

Alternatively, or in combination, user interface 408 may include a keypad 418 such that a user may interact with system 400 by entering data via keypad 418. Keypad 418 may be arranged in various configurations. For example, keypad 418 may comprise a keyboard typically provided with a laptop computer or a keypad typically provided with any of a variety of telephones.

A variety of data may be entered via keypad 418. For example, data identifying called device 110, system 400, and/or calling device 104 may be entered via keypad 418 so as to provide data to be sent via registration request 116. As another example, the data entered via keypad 418 may indicate a new call placed to called device 110 should be rerouted to a location other than called device 110. As yet another example, the data entered via keypad 418 may indicate a call rerouted to client 102 should be answered such that call 134 may be established. Other examples of data that may be provided to system 400 via microphone 408 and/or keypad 418 are also possible.

In another respect, a user may interact with system 400 by receiving data from system 400. User interface 408 may include a display 416, such as a liquid crystal display (LCD), such that a user may receive data being displayed on display 416. As an example, after system 400 receives notification 124, display 416 may display a message that indicates a new call has been placed to called device 110. As another example, after system 400 receives call setup request 132, display 416 may display a message that indicates the new call has been rerouted to system 400. Either or both of these displayed messages may include caller identification information associated with calling device 104 and or called device 110, such as a person's name, a business name, or a telephone number.

Alternatively, or in combination, user interface 408 may include a loud speaker 414 such that a user may receive data played out via loud speaker 414. As an example, loud speaker 414 may play out a ringtone after system 400 receives notification 124 and play out the ringtone again after system 400 receives call setup request 132. As another example, loud speaker 414 may play out the ringtone after system 400 receives notification 124 and then play out a different ringtone after system 400 receives call setup request 132.

3. Exemplary Operation

Figure 5:
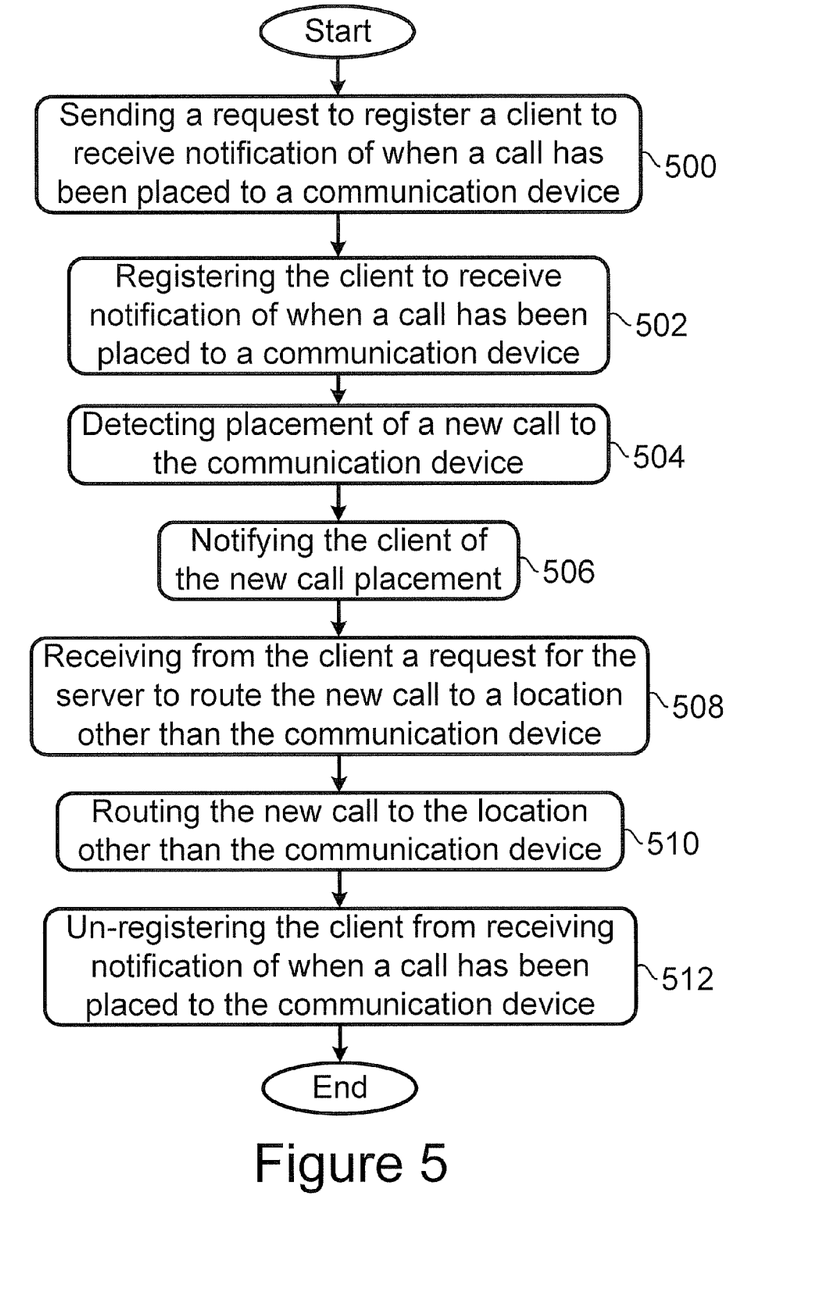
FIG. 5 is a flow chart depicting a set of functions that can be carried out in accordance with exemplary embodiments of the present invention.

FIG. 5 is a flow chart provided to illustrate some functions that may be carried out in accordance with an exemplary embodiment of the present invention. The functions shown in FIG. 5 may be carried out in a sequence as shown in the figure (i.e., from the top of the figure to bottom of the figure) or in another sequence. Further, two or more of the functions shown in the figure may be carried out simultaneously and/or one or more of the functions shown in the figure may be omitted. Further still, one or more of the functions shown in FIG. 5 may be carried out by client 102 or client proxy 136, and/or one or more of the functions shown in FIG. 5 may be carried out by a server such as CSCF server 106, application server 108, HSS 112, or call server 138.

As shown in FIG. 5, block 500 includes sending a request (e.g., registration request 116) to register a client (e.g., client 102) to receive notification of when a call has been placed to a communication device (e.g., called device 110). Registration request 116 may be sent from any of a variety of devices such as client 102 or client proxy 136. Registration request 116 may comprise data indicating a destination for the request, such as application server 108. Registration request 116 may be sent to the destination via a single network (e.g., IP network 135) or a plurality of networks (e.g., RAN 304 and IP network 135). Other examples of sending registration request 116 are also possible.

As an example, registration request 116 may comprise a SIP message, such as a SIP SUBSCRIBE message. By way of example, the SIP SUBSCRIBE message may have the following form:

SUBSCRIBE: sip:application_server@xyz.com SIP/2.0
Via: SIP/2.0/UDP 4.3.2.1
To: Application Server 108 <sip:application_server@xyz.com>
From: Client 102 <sip:client_102@xyz.com>
Call-ID: B1-23-78-01-AB@4.3.2.1
CSeq: 1 SUBSCRIBE
Event: Register to Receive Notification of When New Call Placed to 555-110-0110
Content-Length: 0.

The line starting with "To," may indicate the destination (e.g., application server 108) of registration request 116. The line starting with "Event" may indicate the message is a request to register client 102, and the line starting with "From" may identify the client to be registered.

As another example, registration request 116 may comprise a message including a vertical service code (VSC) (e.g., *211) for requesting registration of client 102 to receive notification of when a call has been placed to called device 110. For instance, the message may comprises the characters *21155511001105551020102. The first four characters (i.e., *211) may represent the VSC for requesting registration of a client, the next ten characters (i.e., 5551100110) may represent the telephone number associated with called device 110, and the last ten characters (i.e., 5551020102) may represent the telephone number associated with client 102. In this way, a server receiving the message with VSC *211 may determine that client 102 is requesting to register to receive notification of when a call has been placed to called device 110.

A message including a VSC for requesting registration of client 102 (or for performance of another function) may comprise DTMF signals representing the characters of the VSC. Alternatively, or in combination, the message including a VSC for requesting registration of client 102 may be a Short Message System (SMS) message. Other examples of registration request 116 are also possible.

Next, block 502 includes registering a client (e.g., client 102) to receive notification of when a call has been placed to a communication device (e.g., called device 110). Registering client 102 to receive notification may be carried out by a server (e.g., application server 108 and/or HSS 112) that receives registration request 116. Registering client 102 to receive notification may include data storage of and/or accessible by application server 108 and/or HSS 112 receiving and then storing data that indicates client 102 is to receive notification of when a new call is placed to called device 110. Registering client 102 may include storing data shown in Table 1. Other examples of registering client 102 are also possible.

Next, block 504 includes detecting placement of a new call to the communication device (e.g., called device 110). Detecting placement of the new call may be carried out by any of a variety of devices (e.g., CSCF server 106). CSCF server 106 may detect placement of the new call in response to receiving new call request 118 message. In response to detecting placement of the new call, CSCF server 106 may query HSS 112 to determine how the new call should be processed. In response to the query, HSS 112 may then query a database to determine how the new call should be processed and provide to CSCF server 106 a response indicating how the new call should be processed. For example, the response may indicate whether that client 102 should be notified that the new call has been placed to called device 110.

As another example, a switch in PSTN 318 may determine a new call has been placed to called device 110. The switch in the PSTN 318 may make this determination after receiving DTMF signals representing a phone number associated with called device 110. In response to determining a new call has been placed to called device 110, the switch may directly or indirectly query a database accessible by the switch to determine how the new call should be processed.

Next, block 506 includes notifying the client (e.g., client 102) of the new call placement.

As an example, application server 108 (or another server) may send notification 124 to client 102 so as to notify client 102 that a new call has been placed to called device 110. Application server 108 may send notification 124 in response to receiving notification 122 and/or determining that the new call has been placed to called device 110.

As an example, notification 124 may comprise a SIP message such as a SIP NOTIFY message. For instance, the SIP NOTIFY message may have the following form:

NOTIFY: sip:client_102@xyz.com SIP/2.0
Via: SIP/2.0/UDP 108.99.3.108:5060
To: Client 102 <sip:client_102@xyz.com>
From: Application Server 108 <sip:application_server@xyz.com>
Call ID: 47999@108.99.3.108
CSeq: 5 NOTIFY
Event: New Call Placed to 555-110-0110
Content-Length: 0

The line starting with "To," may indicate the destination (e.g., client 102) of notification 124. The line starting with "Event" may indicate a new call has been placed to the telephone number 555-110-0110 (i.e., the telephone number associated with called device 110), and the line starting with "From" may identify the server processing the new call.

As another example, notification 124 may comprise one or more SMS messages sent to client 102 via an air interface of RAN 304. The one or more SMS messages may carry as payload the SIP NOTIFY message indicating a new call has been placed to called device 110 or other data as payload indicating a new call has been placed to called device. Other examples of notification 124 are also possible.

In response to receiving notification 124, client 102 may playout an alert so as to alert a user that the new call has been placed to called device 110. The alert may comprise an audible alert played out at loud speaker 414 and/or a visual alert played out at display 416. The alert may identify a name and/or number associated with called device 110 and/or a name and/or number associated with calling device 104. A user receiving the alert may decide whether to request rerouting of the new call based on: (i) who is placing the new call, (i) who is being called, (iii) which device placed the new call, and/or (iv) which device was called. In this regard, client 102 may be registered to receive notification of when a new call is placed to any of a plurality of called devices.

Next, block 508 includes receiving from the client (e.g., client 102) a request for the server (e.g., application server 108) to route the new call to a location other than the communication device (e.g., called device 110). The location other than called device 110 may be client 102, voice mail server 140, or another location. As an example, the request may comprise reroute request 126. Reroute request 126 may be sent in response to client 102 detecting an input entered at user interface 408. The input may be a spoken voice command detected by microphone 412 or a signal generated by keypad 418 while and/or after one or more keys of keypad 418 is/are pressed.

As an example, reroute request 126 may comprise a SIP message such as a SIP NOTIFY message or a SIP INFO message. For instance, the SIP NOTIFY message may have the following form:

NOTIFY: sip:application_server@xyz.com SIP/2.0
Via: SIP/2.0/UDP 4.3.2.1
To: Application Server 108 <sip:application_server@xyz.com>
From: Client 102 <sip:client_102@xyz.com>
Call ID: 23-9B-A4-56-44@4.3.2.1
CSeq: 5 NOTIFY
Event: Reroute call placed to 555-110-0110 to: sip:client_102@xyz.com
Content-Length: 0

The line starting with "To," may indicate the destination (e.g., application server 108) of reroute request 126. The line starting with "Event" may indicate the new call placed to the telephone number 555-110-0110 should be rerouted to client 102, and the line starting with "From" may identify the server processing the new call.

Further, prior to routing the new call to the location other than the called device 110, if the new call is still being routed to the called device 110, routing of the new call to the called device 110 may be stopped. CSCF server 106 may send to called device 110 cancel call alert 130 and/or one or more other messages to stop routing the new call to called device 110.

Next, block 510 includes routing the new call to the location other than the communication device (e.g., called device 110). As indicated above, the location other than called device 110 may be client 102, voice mail server 140, or another location. Routing the new call to the location other than the called device 110 may be carried out in response to application server 108 receiving reroute request 126 and/or CSCF server 106 receiving reroute request 128. Routing the new call to client 102 may include CSCF server 106 sending call setup message 132 to client 102.

As an example, call setup message 132 may comprise a SIP message such as a SIP INVITE message. For instance, the SIP INVITE message may have the following form:

NOTIFY: sip:client_102@xyz.com SIP/2.0
Via: SIP/2.0/UDP 5.6.7.8:5060
To: Client 102 <sip:client_102@xyz.com>
From: CSCF server 106 <sip:CSCF_106@xyz.com>
Call ID: 9083221482@5.6.7.8
CSeq: 1 INVITE
Contact: Calling Device 104 <sip:device_104@xyz.com
Referred by <CSCF_106@5.6.7.8>
Content-Length: 0

The line starting with "To," may indicate the destination (e.g., client 102) of call setup message 132. The line starting with "Contact" may indicate the calling device 104, and the lines starting with "From" and "Referred by" may identify the server processing the new call (e.g., CSCF 106).

As another example, call setup message 132 may comprise a cellular page message in accordance with an air interface protocol, an SMS message, or another type of message.

After receiving call setup message 132, client 102 may send one or more messages to CSCF server 106 and/or calling device 104 so as to complete setting up of call 134 between client 102 and calling device 104.

Next, block 512 includes un-registering the client (e.g., client 102) from receiving notification of when a call has been placed to the communication device (e.g., called device 110). Un-registering client 102 may be carried out using any of a variety of methods. For example, un-registering client 102 may include: (i) client 102 and/or client proxy 136 sending to application server 108 a request to un-register client 102 from receiving notification, (ii) application server 108 requesting HSS 112 to un-register client 102 from receiving notification, and (iii) HSS 112 updating a database such that the database does not indicate client 102 should receive notification. As an example, updating the database may include deleting data that indicates client 102 should receive notification or changing data that indicates client 102 should receive notification to data that indicates client 102 should not receive notification.

As an example, the message to un-register client 102 from receiving notification may comprise a SIP message such as a SIP UNSUBSCRIBE message. For instance, the SIP UNSUBSCRIBE message may have the following form:

UNSUBSCRIBE: sip:application_server@xyz.com SIP/2.0
Via: SIP/2.0/UDP 9.8.7.6
To: Application Server 108 <sip:application_server@xyz.com>
From: Client Proxy 136 <sip:client_proxy@xyz.com>
Call-ID: 14-DE-0F-61-B0@9.8.7.6
CSeq: 1 UNSUBSCRIBE
Event: Cancel Notifications sent to Client 102 for new calls placed to 555-110-0110
Content-Length: 0.

The line starting with "To" may indicate the destination (e.g., application server 108) of the message for un-registering client 102. The line starting with "Event" may indicate cancel sending to client 102 notifications of when a new call is placed to 555-110-0110, and the line starting with "From" may identify the client proxy sending the message for un-registering client 102.

As another example, the message to un-register client 102 may comprise a VSC (e.g., *123) for requesting to un-register client 102 from receiving notification of when a new call is placed to called device 110. For instance, the message may comprise the characters *1235551020102555110 0110. The first four characters (i.e., *123) may represent the VSC for requesting un-registration of a client, the next ten characters (i.e., 5551020102) may represent the telephone number associated with client 102, and the last ten characters (i.e. 5551100110) may represent a telephone number associated with called device 110. In this way, a server receiving the message with VSC *123 may determine that client 102 is requesting to un-register from receiving notification of when a new call is placed to called device 110. Other examples of a message to un-register client 102 from receiving notification of when a new call is placed to called device 110 are also possible.

After un-registering client 102 from receiving notification of when a new call is placed to called device 110, client 102 will no longer receive notification of when a new call is placed to called device 110.

4. Conclusion

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. A method comprising:
    registering, at a server, a first device to receive notification that a call has been placed to a second device;
    detecting, using the server, placement of a new call from a calling device to the second device;
    transmitting, using the server in response to detecting placement of the new call, a first session initiation protocol (SIP) message to the first device and a second SIP message to the second device, wherein the first SIP message comprises data indicating the new call can be routed to a device other than the second device, and wherein the second SIP message comprises a call-alert;
    receiving, at the server, a third SIP message transmitted from the first device after the server transmits the first SIP message but prior to the calling device establishing the new call with either the second device or the device other than the second device, wherein the third SIP message comprises a request for the server to route the new call to the device other than the second device;
    transmitting, using the server, a fourth SIP message to the second device, wherein the fourth SIP message comprises a cancel-call-alert; and
    transmitting, using the server, at least one other SIP message to the device other than the second device, wherein the at least one other SIP message is for establishing the new call between the calling device and the device other than the second device.

2. The method of claim 1,
    wherein the device other than the second device is the first device.

3. The method of claim 1,
    wherein the device other than the second device is a voice mail server providing voice mail services for the first device.

4. The method of claim 1,
    wherein registering the first device to receive the notification that a call has been placed to the second device comprises storing, in a data storage device accessible by the server, data indicating the first device should receive notification that a call has been placed to the second device.

5. The method of claim 1,
    wherein registering the first device comprises the server receiving a SIP SUBSCRIBE message including a request for the server to register the first device, and
    wherein the first SIP message comprises a SIP NOTIFY.

6. The method of claim 1, further comprising:
    receiving, at the server from the first device, a request to un-register the first device from receiving notification that a call has been placed to the second device, and responsively un-registering the first device from receiving notification that a call has been placed to the second device,
    whereby the server then no longer notifies the first device that a call is placed to the second device.

7. The method of claim 6, wherein the request to un-register the first device comprises a SIP UNSUBSCRIBE message.

8. The method of claim 1, wherein the new call is a voice call, a video call, or a data call.

9. The method of claim 1, further comprising:
    registering at least one other device to receive notification that a call has been placed to the second device, and
    in response to detecting placement of the new call to the second device, notifying the at least one other device of the new call placement.

10. The method of claim 1, wherein the server is selected from the group consisting of: (i) a home subscriber server (HSS), (ii) an application server, and (iii) a call server.

11. The method of claim 1, wherein the first device client device is assigned a first telephone number and the second device is assigned a second telephone number that differs from the first telephone number.

12. The method of claim 1,
    wherein the call-alert is for causing the second device to play a ringtone to indicate placement of the new call to the second device, and
    wherein the cancel-call-alert is for causing the second device to stop playing the ringtone.

13. A method comprising:
    sending, to a server from a first device, a first Short Message Service (SMS) message comprising a request for the server to register the first device to receive notification that a call has been placed to a second device, wherein the first device comprises a wireless communication device;
    receiving, at the first device from the server, a second SMS message, wherein the second SMS message indicates that a new call, placed to the second device from a calling device, can be routed to a device other than the second device; and
    transmitting, to the server from the first device after the first device receives the first SMS message but prior to the calling device establishing the new call with either the second device or the device other than the second device, a third SMS message, wherein the third SMS message comprises a request for the server to route the new call to the device other than the second device.

14. The method of claim 13, further comprising:
    receiving, at the first device, a call setup request; and
    thereafter, the first device establishing the new call with the calling device,
    wherein the first device is the device other than the second device.

15. The method of claim 14,
    wherein the call setup request comprises a cellular page message.

16. The method of claim 13,
    wherein the calling device comprises a wireless communication device or a wireline communication device.

17. The method of claim 13,
    wherein the device other than the second device is the first device,
    the method further comprising:
    receiving the new call at the first device in response to the first device sending the request for the server to route the new call to the device other than the second device.

18. The method of claim 13,
wherein the device other than the second device is a voice mail server providing voice mail services for the first device,
the method further comprising:
establishing, using the first device, communication with the voice mail server; and
requesting, to retrieve for the first device from the voice mail server, a voice mail message stored by a caller that placed the new call.

19. A wireless communication device comprising:
a user interface;
a processor;
a network communications section for communicating with a server via a wireless network; and
a data storage device,
wherein the data storage device contains program logic executable by the processor to cause the network communications section to transmit, to the server using the wireless network, a first Short Message Service (SMS) message comprising a request for the server to register the wireless communication device to receive notification that a call has been placed to a second device,
wherein the network communications section is arranged to receive a second SMS message transmitted from the server, wherein the second SMS message indicates that a new call, placed to the second device from a calling device, can be routed to a device other than the second device, and
wherein the data storage device contains program logic executable by the processor to transmit, to the server after the wireless communication device transmits the first SMS message but prior to the calling device establishing the new call with either the second device or the device other than the second device, a third SMS message, wherein the third SMS message comprises a request to route the new call to the device other than the second device.

20. The wireless communication device of claim 19,
wherein the request to route the new call comprises a request to route the new call to a voice mail server providing voice mail services for the wireless communication device, and
wherein the voice mail server allows a caller that placed the new call to store a voice mail message that can be accessed by the wireless communication device.

21. The wireless communication device claim 19,
wherein the request to route the new call comprises a request to route the new call to the wireless communication device, and
wherein the network communications section receives the new call after transmission of the third SMS message.

22. The wireless communication device of claim 19,
wherein the user interface includes a microphone for: (i) detecting a voice command to request re-routing of the new call, and (ii) providing the processor with a signal representing the voice command, and
wherein in response to receiving the signal representing the voice command, the processor executes the program logic to transmit the third SMS message.

23. A server system comprising:
one or more servers configured to serve a first device and a second device;
a data storage device storing computer-readable program logic; and
a processor configured to execute the computer-readable program logic,
wherein the processor executes the computer-readable program logic to register the first device to receive notification that a call has been placed to a second device,
wherein the processor executes the computer-readable program logic to detect placement of a new call to the second device,
wherein the processor executes the computer-readable program logic to transmit, in response to detecting placement of the new call, a first session initiation protocol (SIP) message to the first device and a second SIP message to the second device, wherein the first SIP message comprises data indicating the new call can be routed to a device other than the second device, and wherein the second SIP message comprises a call-alert,
wherein the server system receives a third SIP message transmitted from the first device after the processor transmits the first SIP message but prior to the calling device establishing the new call with either the second device or the device other than the second device, wherein the third SIP message comprises a request for the server system to route the new call to the device other than the second device, and
wherein the processor executes the computer-readable program logic to transmit at least one other SIP message to the device other than the second device, wherein the at least one other SIP message is for establishing the new call between the calling device and the device other than the second device.

24. The server system of claim 23,
wherein the data storage device stores data that identifies a first IP address, a second IP address, and a third IP address,
wherein the first IP address is associated with the first device,
wherein the second IP address is associated with the second device, and
wherein the third IP address is associated with the device other than the second device.

25. The server system of claim 23, wherein the communication device other than the second device comprises the first device.

26. The server system of claim 24, wherein the device other than the second device comprises a voice mail server.

27. The server system of claim 24, wherein the data storage device stores registration data that identifies how the new called placed to the second device is to be routed to the device other than the second device.

\* \* \* \* \*